United States Patent [19]

Kosaka et al.

[11] 3,877,068

[45] Apr. 8, 1975

[54] METHOD AND APPARATUS FOR CONTROLLING COLOR BALANCE OF A COLOR TELEVISION SYSTEM

[75] Inventors: Takeshi Kosaka, Sakai; Sanjiro Murakami, Kobe, both of Japan

[73] Assignee: Minolta Camera Kabushiki Kaisha, Osaka, Japan

[22] Filed: Sept. 1, 1972

[21] Appl. No.: 285,600

Related U.S. Application Data

[63] Continuation-in-part of Ser. No. 117,413, Feb. 22, 1971, abandoned.

[30] Foreign Application Priority Data

Feb. 21, 1970 Japan .......................... 45-15009

[52] U.S. Cl. .......................... 358/29

[51] Int. Cl. .......................... H04n 9/02

[58] Field of Search .......................... 178/5.4 BT

[56] References Cited

UNITED STATES PATENTS 3,479,448 11/1969 Kollsman .......................... 178/5.4 BT 3,573,352 4/1971 Fujita .......................... 178/5.4 BT

*Primary Examiner*—Richard Murray

*Assistant Examiner*—George G. Stellar

*Attorney, Agent, or Firm*—Craig & Antonelli

[57] ABSTRACT

Color balance of a color television picture can be automatically controlled by controlling signals generated in an apparatus, which comprises a computing circuit which calculates each mean value of the light intensities in at least two regions of the television picture, each intensity being detected with each photoelectric transducer for each primary color light in each region, and a circuit which generates controlling signals by comparing each mean value of theoretical primary color light to each of the theoretically predetermined standard values. By employing the above-mentioned apparatus and method thereof, the color balance of a color television system can well be controlled without any standard white light source or any standard color signal source.

20 Claims, 9 Drawing Figures

FIG.1

METHOD AND APPARATUS FOR CONTROLLING COLOR BALANCE OF A COLOR TELEVISION SYSTEM

This is a continuation-in-part of application Ser. No. 117,413 filed Feb. 22, 1971, now abandoned.

BACKGROUND OF THE INVENTION

This invention relates to a method and apparatus for controlling the color balance of a color television system.

In the conventional system of television broadcasting, control of color balance is not generally performed in the broadcasting station, but is performed in a part of the television receiving sets in accordance with the judgement of persons watching the picture screens. Although an attempt has been made to control the color balance of a color picture signal, which is recorded in a video-tape recorder, by feeding back a signal obtained through a monitoring television receiver to the signal amplifying system, this scheme is also governed by the judgment of the person who adjusts the feedback system.

Since it is almost impossible to indicate the exact colors of light of a real scene on a picture screen of a color television set, a practical and efficient way to achieve color balance is to control the color balance of picture signal in accordance with a certain law which enables indication of a reasonable color expression with a certain harmony.

SUMMARY OF THE PRESENT INVENTION

This invention provides a novel method and apparatus for controlling a color television system capable of producing practically satisfactory color expression.

It has been well established in the field of color photography that a large majority of natural scenes have reflections which integrate into grey (British Pat. No. 883,670). Therefore, although there are many small parts of various colors in the natural scenes, it is presumed that the ratio of a primary color light against the integrated light generally converges to a certain value. This invention is developed from the above-mentioned presumption.

The apparatus of the present invention is characterized as comprising a computing circuit which calculates each mean value of light intensities in at least two regions of a television picture, each intensity being detected with an individual photoelectric transducer for each primary color light in each region, and a circuit which generates controlling signals by comparing each mean value of primary color light to each of the theoretically predetermined standard values.

The method of the present invention is characterized by the steps of measuring the energies of primary colors in different regions of a television picture, generating mean quantity values of the energies for each of the colors from the measured energies, adding the mean quantity values for the primary colors and dividing the added values in a predetermined ratio, comparing the divided quantity values with corresponding values of the mean quantity values, and controlling the system in accordance with the differences obtained by the comparison.

BRIEF DESCRIPTION OF THE DRAWINGS

Further objects and advantages will be best understood from the following detailed description when read in conjunction with the accompanying drawings, in which.

DETAILED DESCRIPTION OF THE PRESENT INVENTION

The inventors have conducted the following experiment. First, two hundred color slides of various scenes were collected. Each scene of the color slides was picked up by a color television pick-up camera of a closed circuit color television system. A monitoring television receiver was controlled in turn by several experts skilled in valuation of color pictures, so that the best pictures were produced on its picture screen; namely, the best color balances that could be obtained. Then, quantity values of the three primary colors of the picture were measured in each of six predetermined regions on the picture screen utilizing a color analyzer as disclosed in the commonly assigned, U.S. application, Ser. No. 764,081 filed Oct. 1, 1968 now abandoned. The disclosure of this application insofar as is necessary is incorporated herein by reference. The application for the color analyzer also corresponds to British Pat. No. 1,247,737 and French Pat. No. 1,586,007.

The quantity values of the primary colors at the six regions are computed in such a manner that the six red quantity values are computed to produce a red mean value R, the six green quantity values are computed to produce a green mean value G and the six blue quantity values are computed to produce a blue mean value B. In computing each of the mean values R, G and B, mathematical mean, geometrical mean and harmonic mean computations were made.

Then, the following ratios $r$ and $g$ are calculated in each mean system, $$r = R/(R + G + B) \quad (1)$$

$$g = G/(R + G + B) \quad (2)$$

$$b = 1 - r - g.$$

The computed ratios, $r$ and $g$, in the above experiment based on two hundred color slides converged within ranges of the values as indicated in the following list.

List of ranges of $r$ and $g$

| | $r$ | $g$ |
|---|---|---|
| Mathematical mean | 0.30 to 0.38 | 0.32 to 0.38 |
| Geometrical mean | 0.30 to 0.38 | 0.30 to 0.38 |
| Harmonic mean | 0.30 to 0.40 | 0.30 to 0.35 |

From the above-mentioned experiments, it is presumed that pictures of a television system will have good balance under the condition that each of the above-mentioned ratios $r$ and $g$ lies in the central value of the above-mentioned ranges in the list; namely, for example, that the mathematical mean for the ratio $r$ is 0.34 and for the ratio $g$ is 0.35. The Experiments have proved the aforementioned presumption is correct, and accordingly, there is no use of comparing the color balance of the picture to that of the natural scenery.

An embodiment of the present invention is constituted as follows so as to embody the above-mentioned principle.

Figure 1:
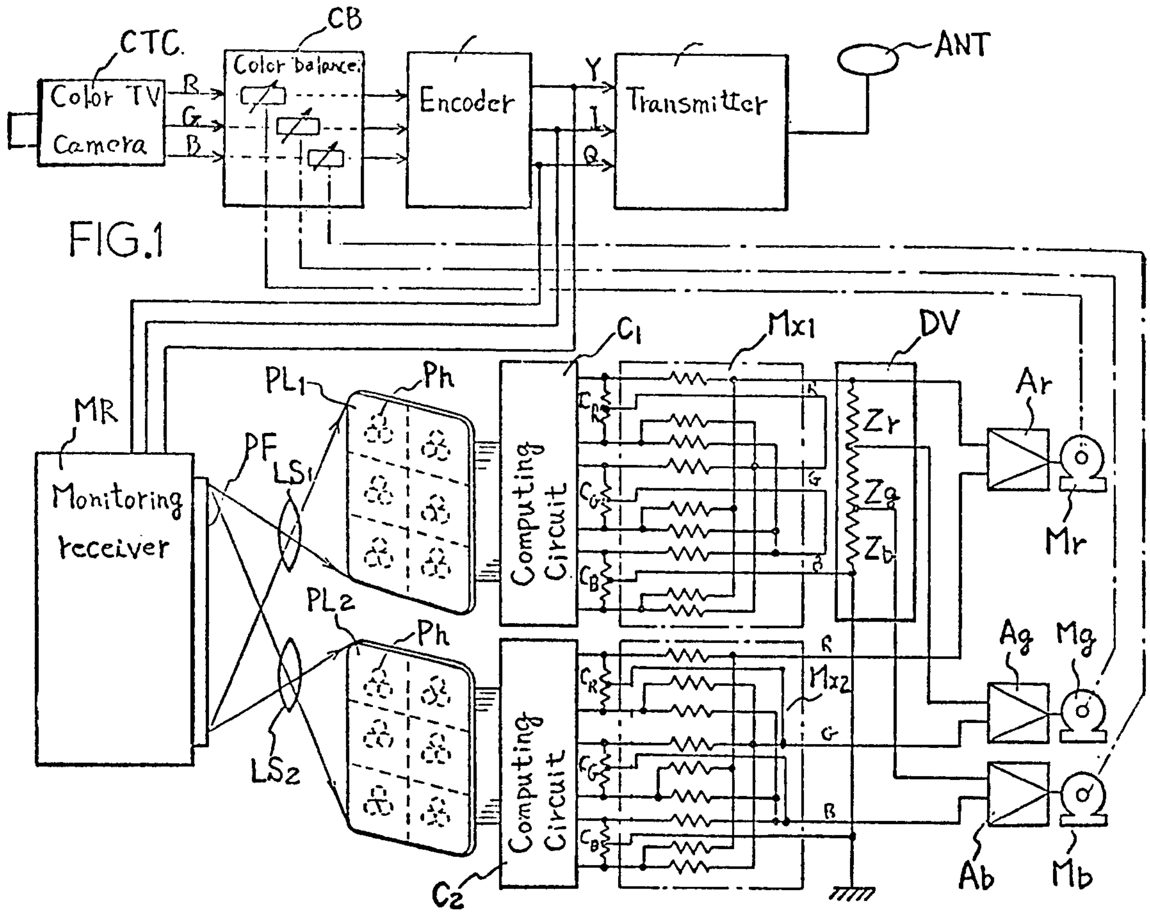
FIG. 1 is a schematic block diagram of an apparatus for controlling the color balance of a color television signal in a broadcasting station embodying the invention.

In FIG. 1, output color signals of the three principal colors (red, green and blue) indicated by R, G and B, of a color television camera CTC are transmitted to a color balancer network CB which includes variable attenuators controlled by motors $Mr$, Mg and $Mb$. Color signals from the color balancer CB are then encoded by an encoder EC to generate known color television signals, consisting of Y, I and Q signals. This color television signal is then transmitted to a transmitter TM and is broadcast from an antenna ANT.

Figure 3:
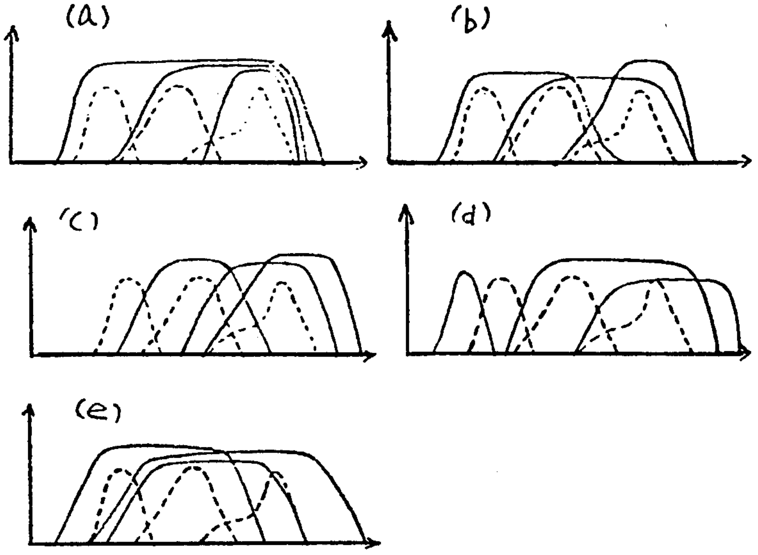
FIGS. 3*a*–3*e* illustrate five examples of the relationship of curves of the spectral sensitivities of the photoelectric elements as shown in the solid line and curves of the spectral distribution characteristics of the primary colors as shown in broken line in accordance with the present invention. The curves are plotted with the abscissa representing wavelength and the ordinate representing the relative radiant energies of the primary colors and the relative sensitivity of the photoelectric elements.
Figure 5A:
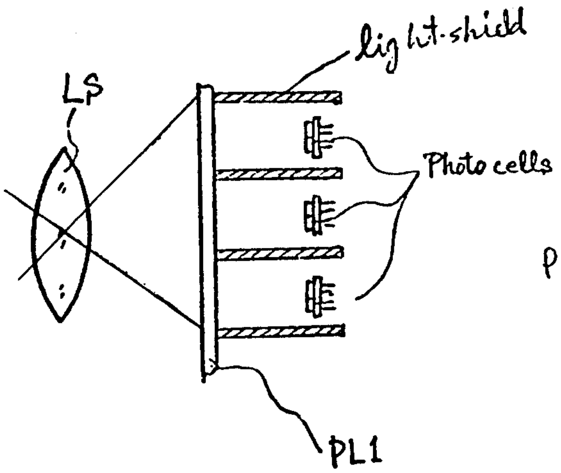
FIGS. 5*a* and 5*b* are partial side views and rear perspective views, respectively, of portions of the optical measuring system of the present invention.
Figure 5B:
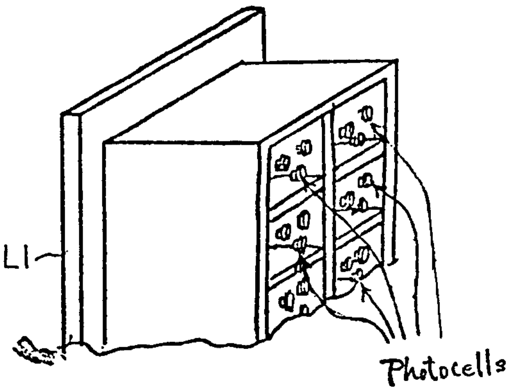

A monitoring television receiver MR is fed with said color television signal from the encoder to make a monitoring picture on its picture screen PF. The picture is projected on a pair of opaque-white light diffusion plates $PL_1$ and $PL_2$ by a pair of projecting lens $LS_1$ and $LS_2$. Each diffusion plate $PL_1$ or $PL_2$ has several light-receiving regions, behind each of which is placed one set of three photoelectric elements or photocells as shown in FIGS. 5$a$ and 5$b$. Each of the sets of elements consists of three photoelectric elements having peak sensitivities at the red, green and blue primary color lights, respectively and are separated from other sets of elements and external light by light shields so that the sets of photoelectric elements receive light only from the respective divided parts of the plate facing thereto. Alternatively, the sensitivities of the photoelectric elements may be such that the quantity values of the three primary colors can be separated through the matrix circuit which is employed in the color analyzer. FIGS. 3$a$ to $e$ illustrate five examples of such sensitivities, wherein the abscissa represents wavelength and the ordinate represents the relative radiant energies of the primary colors as shown by the dashed line curves and relative sensitivity of the elements as shown by the solid curves. The dashed line curves illustrate the spectral distribution characteristics of the primary colors and the solid curves illustrate the spectral sensitivities of the elements.

Conditions of the above-mentioned spectral sensitivities of three photoelectric elements in these five examples are that, in each example, 1. The three spectral sensitivities of the elements (shown by solid curves) extend differently from each other in the spectral bands,
2. A curve obtained by superposing two of the (solid) curves representing the three spectral sensitivities of the elements extends differently in the spectral bands from the other remaining (solid) curve of the element,
3. Each of said three spectral sensitivities of the elements (shown by solid curves) and at least one of said spectral distribution of three primary colors (dashed curves) overlap each other in extending spectral bands and
4. Each of said three spectral distributions of the three primary colors (dashed line curves) and at least one of spectral sensitivity of the elements (solid curves) overlap each other in their spectral-band extents.

The larger the number of the regions provided the better will be the reliability of detection and control of the color balance. In practical control of a television broadcasting system, six regions give sufficient results. Output signals of photoelectric elements Ph positioned behind the plates $PL_1$ and $PL_2$ are applied to the computing circuits $C_1$ and $C_2$, respectively, so that each mean value of the outputs of the photoelectric elements Ph for each primary color light is obtained.

Harmonic Mean

Figure 2A:
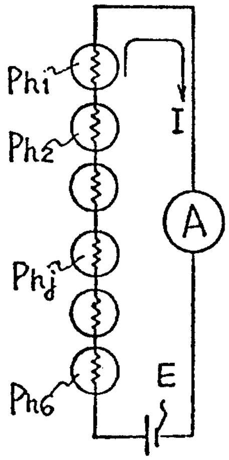
FIG. 2*a* is a circuit diagram of an example of the computing circuit for obtaining a harmonic mean of the outputs of photoelectric transducers in the apparatus shown in FIG. 1.

When six photoelectric elements $Ph_1$–$Ph_6$ and a D.C. voltage source E are connected in series across a low resistance load A as shown in FIG. 2$a$, under the condition that the $\gamma$-value of the photoelectric elements is about 1, a harmonic mean value of the six photoelectric elements is obtained as a current output in the load A. The reason why the harmonic mean is obtained with the connection shown in FIG. 2$a$ is as follows:

The current I of the load A is given by $$I = \frac{E}{K}\left(\sum_{j=1}^{j=6} L_j^{-\gamma}\right)^{-1} \quad (3)$$

where $K$ is a constant,
$E$ is the voltage of the voltage source $E$,
$L_j$ is the light intensity striking on the $j$-th element, and
$\gamma$ is a constant of the photoelectric elements.

Under the condition that $\gamma = 1$, equation 3 is written as $$I = \frac{E}{K}\left(\sum_{j=1}^{j=6} \frac{1}{L_j}\right)^{-1} \quad (4)$$

When the elements are calibrated by lights $Lo$ of uniform intensity so as to produce a calibrated output value, current $Im$ flowing through the load A for lights $mLo$ of varied intensity is represented by $$Im = E/K \cdot (6/mLo)^{-1}$$

$$\text{or } mLo = K/E \cdot 6 \cdot Im \qquad (5)$$

When non-uniform lights $Lx_1$, $Lx_2$, .... strike elements $Ph_1$, $Ph_2$, ...., respectively, the resultant load current $Ix$ is given by $$Ix = \frac{E}{K}\left(\sum_{j=1}^{j=6}\frac{1}{Lx_j}\right)^{-1} \qquad (6)$$

By defining $Ix$ to be equal to $Im$, the following equation is obtained from the equations 5 and 6.

$$mLo = \frac{6}{\frac{1}{Lx_1}+\frac{1}{Lx_2}+\frac{1}{Lx_3}+\frac{1}{Lx_4}+\frac{1}{Lx_5}+\frac{1}{Lx_6}} \qquad (7)$$

This equation (7) indicates that the resultant output of the load A is equal to the output of a uniform light having an intensity of the harmonic mean of the lights striking each of the series-connected elements $Ph$.

Mathematical Mean

Figure 2B:
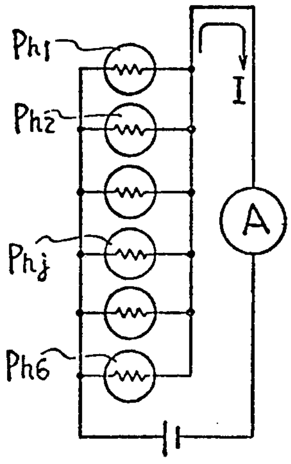
FIG. 2*b* is a circuit diagram of an example of the computing circuit for obtaining the mathematical mean of the outputs of the photoelectric transducers in the apparatus shown in FIG. 1.

When six photoelectric elements $Ph_1$ – $Ph_6$ are connected in parallel across a load A through a D.C. voltage source E, as shown in FIG. 2*b*, under the condition that the $\gamma$-values of the photoelectric elements are about 1, a mathematical mean value of the six photoelectric elements is obtained as a current output of the load A. The reason why the mathematical mean is obtained with the connection shown in FIG. 2*b* is as follows.

The combined resistance of the parallel-connected elements $Ph_1$ – $Ph_6$ is given by $$\frac{1}{r} = \sum_{j=1}^{j=6}\frac{1}{r_j} = \frac{1}{K}\sum_{j=1}^{j=6}L_j^{\gamma} \qquad (8)$$

wherein the symbols corresponding to those described in the foregoing paragraphs relate to the same quantities.

Accordingly, the current I of the load A is given by $$I = \frac{E}{r} = \frac{E}{K}\sum_{j=1}^{j=6}L_j^{\gamma} \qquad (9)$$

Under the condition of $\gamma = 1$, equation 9 is written as $$I = \frac{E}{K}\sum_{j=1}^{j=6}L_j \qquad (10)$$

When the elements are calibrated by uniform lights $Lo$ to produce a calibrated output value, current $Im$ flowing through the load A of lights $mLo$ of varied intensity is represented by $$Im = (E/K) \cdot 6mLo \qquad (11).$$

$$\text{or } m = (K/E) \cdot (Im/6Lo) \qquad (12).$$

When non-uniform lights $Lx_1$, $Lx_2$, ..... strike the elements $Ph_1$, $Ph_2$ ....... respectively, the resultant load current $Ix$ is given by $$Ix = \frac{E}{K}\sum_{j=1}^{j=6}Lx_j \qquad (13)$$

By defining $Ix$ to be equal to $Im$, the following equation is made from the equation 12 and 13

$$m = \frac{K}{6Lo}\sum_{j=1}^{j=6}\cdot Lx_j \qquad (14)$$

or $$mLo = (K/6)(Lx_1 + Lx_2 + Lx_3 + Lx_4 + Lx_5 + Lx_6) \qquad (15).$$

This equation (15) indicates that the resultant output in the load A is equal to the output of a uniform light having the intensity of the mathematical mean of the lights striking each of the parallel-connected elements $Ph_1$–$Ph_6$.

Geometric Mean

Figure 2C:
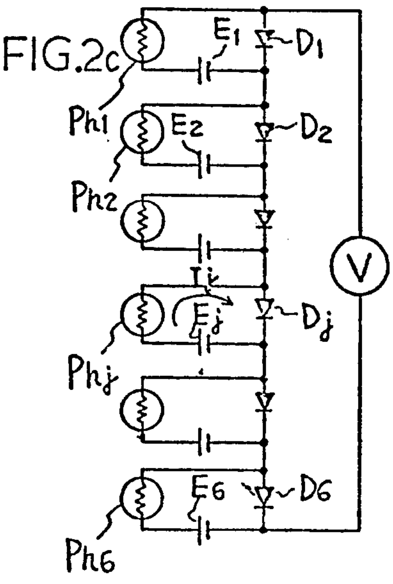
FIG. 2*c* is a circuit diagram of an example of the computing circuit for obtaining the geometric mean of the outputs of the photoelectric transducers in the apparatus shown in FIG. 1.

When each of the photoelectric elements $Ph_1$–$Ph_6$ is connected in series with each of the D.C. voltage sources $E_1$–$E_6$ across each of the diodes $D_1$–$D_6$, all of which diodes $D_1$–$D_6$ are connected in series across a load V, as shown in FIG. 2*c*, a geometric mean value of the six photoelectric elements is obtained as an output voltage in the load V. The reason why the geometric mean is obtained with the connection shown in FIG. 2*c* is as follows.

Resistance $Ri$ of the *j*-th photoelectric element is given by $$R_j = K_jL_j^{-\gamma} \qquad (16)$$

Where $K_j$ is a constant for *j*-th element $Ph_j$. Under the condition that each resistance of the diode $D_j$ is negligibly smaller than each resistance of the photoelectric element, and that each voltage $E_j$ of the *j*-th voltage source $E_j$ is constant; namely, that resistances of the voltage sources are negligibly small, forward current $I_j$ of diode $D_j$ is given by $$I_j = Is_j\, e^{(qV_j - 1)} \qquad (17)$$

where $I_{sj}$ is a constant for the *j*-th diode $D_j$, $q$ is a constant which is common for all diodes $D_1$–$D_6$ $V_j$ is a forward voltage of the *j*-th diode $D_j$, and $e$ is base of natural logarithm.

On the other hand, in each closed circuit formed by series-connecting a diode $D_j$, and D.C. voltage source $E_j$ and a photoelectric element $Ph_j$ in a loop, the loop current $I_j$ is given by $$I_j = E_j/R_j \quad (18).$$

Under the condition of $I_j >> Is_j$, from equations 16, 17 and 18, the following equation is obtained:

$$V_j = (\gamma/q)\log L_j + \log (E_j/K_j \cdot Is_j)^{1/q} \quad (19)$$

Accordingly, voltage V obtained across the load V is $$V = \sum_{j=1}^{j=6} V_j$$

$$= (\gamma/q)\log(L_1 \cdot L_2 \cdots L_6) + \log([E_1 \cdot E_2 \cdots\cdots E_6]/[C_1 \cdot C_2 \cdots C_6 \cdot Is_1 \cdot Is_2 \cdots Is_6])^{1/q} \quad (20).$$

By defining constant $K'$ as $$K' = \log([E_1 \cdot E_2 \cdots E_6]/[C_1 \cdot C_2 \cdots C_6 \cdot Is_1 \cdot Is_2 \cdots Is_6])^{1/q},$$

$$V = \gamma/q \log (L_1 \cdot L_2 \cdots L_6) + K \quad (21).$$

When the elements are calibrated by uniform lights $Lo$ to produce a calibrated output voltage across the load V, the voltage $Vm$ for uniform lights $mLo$ of varied intensity is represented by $$Vm = (\gamma/q)\log(mLo \cdot mLo \cdot mLo \cdot mLo \cdot mLo \cdot mLo) + K$$

or $$Vm = (\gamma/q)\log(m^6 \cdot Lo \cdot Lo \cdot Lo \cdot Lo \cdot Lo \cdot Lo) + K \quad (22)$$

When non-uniform lights $Lx_1$, $Lx_2$, ..... strike the elements $Ph_1$, $Ph_2$ ....., respectively, the voltage $Vx$ across the load V is given by $$Vx = (\gamma/q)\log(Lx_1 \cdot Lx_2 \cdots Lx_6) + K \quad (23)$$

By defining $Vx$ to be equal to $Vm$, from the equation 22 and 23, $$m^6 \cdot Lo^6 = Lx_1 \cdot Lx_2 \cdots Lx_6,$$

$$\text{or } m = Lc \sqrt[6]{Lx_1 \cdot Lx_2 \cdots Lx_6} \quad (24),$$

where $Lc$ is a constant defined by $Lc = (Lo)^{-1/6}$. The equation 24 implies that the resultant output in the load V is equal to the output for a uniform light having the intensity of the geometric mean of the lights striking each of the photoelectric elements $Ph_1$–$Ph_6$.

The outputs of the computing circuits $C_1$ and $C_2$ are applied to the first and second matrix circuits $Mx_1$ and $Mx_2$, respectively, in order to obtain energy levels R, G and B therefrom for red, green and blue primary color lights, respectively.

The matrix circuits $Mx_1$ and $Mx_2$ are the same circuits used in the color analyzer described in the aforementioned experiment for obtaining the List of ranges of $r$ and $g$, and produces quantity values of three primary colors R, G and B at their output terminals. Of course, the quantity values R, G and B may be mathematical means, geometric means or harmonic means. In these circuits, circuit constants of the matrices are so designed such that the circuits perform the computation of the following equation in an electrical analog manner.

$$\begin{bmatrix} R \\ G \\ B \end{bmatrix} = \begin{bmatrix} A11 & A12 & A13 \\ A21 & A22 & A23 \\ A31 & A32 & A33 \end{bmatrix} \begin{bmatrix} C_R \\ C_G \\ C_B \end{bmatrix} \quad (25)$$

Wherein $C_R$, $C_G$ and $C_B$ are output quantities of the computing circuits $C_1$ and $C_2$, and $Aij$ ($i = 1$ to 3, $j = 1$ to 3) are constants determined in accordance with the spectral distribution characteristics of each of primary colors and with the spectral sensitivity of each of the detecting means. In the aforementioned experiments, quantity values of three primary colors were measured first, and secondly, the mean values R, G and B of the measured quantity values were computed. In contradistinction, in this embodiment, mean values of the outputs of the photoelectric elements are obtained first, and secondly, quantity values of the three primary colors are obtained. However, the difference in the order between computing means and obtaining quantity values of the colors through the matrix circuits makes no substantial difference. Accordingly, output signals of the matrix circuits $Mx_1$ and $Mx_2$ can be obtained in substantially the same manner as the aforementioned experiment in which R, G and B are obtained.

The ratio of the resistors $Zr$, $Zg$ and $Zb$ of the dividing or selecting network DV connected across the output terminals of the first matrix $Mx_1$ is so selected that divided or selected output signals across each of the resistors should have a preset standard ratio or predetermined fraction of the total signal. Such standard ratio should be selected to correspond to the center values of the ranges of $r$, $g$ and $b$ given in the aforementioned List of ranges of $r$ and $g$. An example of such standard ratio is $r : g : b = 0.34 : 0.35 : 0.31$ when the mathematical mean is employed.

Differential amplifiers $Ar$, $Ag$ and $Ab$ amplify differences between the outputs of the dividing network DV and the outputs of the second matrix $Mx_2$, respectively, and apply signals to the correction motors $Mr$, $Mg$ and $Mb$ to drive and adjust the attentuators of the color balancer CB, respectively.

When color balance of the signals from the color television camera CTC is good enough, the matrices $Mx_1$ and $Mx_2$ will produce R, G and B signals which causes the ratios $r$ and $g$ defined by the equations 1 and 2 to meet the above-mentioned predetermined standard ratios. Accordingly, the outputs of the matrix $Mx_2$ become equal to those of the dividing network DV. In this condition, differential amplifiers $Ar$, $Ag$ or $Ab$ have no output, and therefore, motors $Mr$, $Mg$ and $Mb$ remain stationary.

When the color balance of the signals from the color television camera CTC is not good, the matrices $Mx_1$ and $Mx_2$ will produce R, G, and B signals which causes the ratios $r$ and $g$ to be apart from the above-mentioned predetermined standard ratios. Accordingly, the outputs of the matrix $Mx_2$ become different from those of the dividing network DV. In this condition, differential amplifiers A*r*, A*g* or A*b* produce output signals, and therefore, motors M*r*, M*g* and M*b* move until differences between the outputs of the matrix $Mx_2$ and those of dividing network DV are reduced to zero. As a result, balance of color of the color television system can be automatically controlled to produce the best results.

In the above-mentioned example, two matrix circuits are employed, one for producing input signals to the dividing network DV and the other for producing R, G and B signals, respectively. However, it is possible to form the practical apparatus with only one matrix circuit. Namely, it is possible to obtain input signals to differential amplifiers by feeding the sum of three primary color output signals (R + G + B) of the matrix circuit to a dividing network, and on the other hand, by taking out the R, G and B signals directly from the same matrix circuit, and then comparing these direct R, G and B signals with output signals of said dividing network, respectively.

Figure 4:
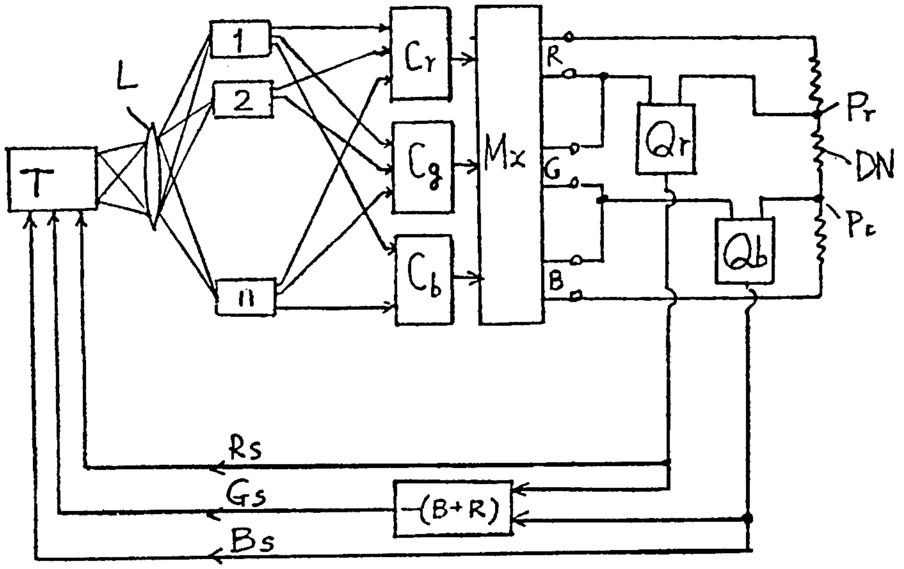
FIG. 4 is a schematic block diagram of another embodiment of the apparatus of the present invention.

As shown in FIG. 4 which illustrates a second embodiment of the present invention, the picture of the monitoring television receiver T is projected on a pair of light measuring parts 1, 2, . . . , *n* through a projecting lens L. Each part comprises an opaque-white light diffusion plate on which the picture is projected, and behind the diffusion plate is placed one set of three photoelectric elements. Each of the sets of elements consists of three photoelectric elements having peak sensitivities at the red, green and blue primary color lights, respectively. Output signals of photoelectric elements positioned in each part 1, ....., *n* are applied to the computing circuits C*r*, C*g* and C*b*, so that mean value of the outputs of the photoelectric elements with peak sensitivities at red, green and blue are obtained by the computing circuits C*r*, C*g* and C*b*, respectively. The outut circuits of the computing circuits C*r*, C*g* and C*b* are connected to a matrix circuit Mx in order to obtain energy levels R, G and B for red, green and blue pimary color lights therefrom, respectively. The matrix circuit Mx is the same as that used in the color analyzer in the aforementioned experiment for obtaining the List of ranges of *r* and *g*, and produces quantity values of primary colors R, G and B at its output terminals. Of course, the quantity values R, G and B may be mathematical, geometrical or harmonic mean values. In the matrix circuit, the circuit constants are selected in the same manner as the aforementioned experiment in relation to the matrix circuits $Mx_1$ and $Mx_2$ of the first example. Then, three outputs for the three colors are connected in series as to obtain a superposed output, and the superposed output is then divided by a dividing network DN, which divides the output into the aforementioned predetermined ratios, for instance, 0.34 : 0.35 : 0.31. The divided voltages at the dividing points P*r* and P*b* are then compared with the output voltages of the computing circuits C*r* and C*b*, by means of the comparison circuits Q*r* and Q*b*, respectively. The outputs of the comparison circuits Q*r* and Q*b* and a signal which is obtained as a negative of superposition of the outputs R*s* and B*s* are fed to the color control circuit (not shown) of the monitoring television receiver T, as color control signals R*s*, G*s* and B*s*. Thus, by utilizing the control signals R*s*, G*s* and B*s* as feedback signals, the monitoring television receiver is controlled so as to make all of the control signals R*s*, G*s* and B*s* zero.

When photoelectric elements having a quick-response characteristic, for instance, silicon-solar-batteries are used, it is recommended to insert the mean time circuits in the output circuits of the photoelectric elements, respectively, in order to avoid adverse influence of the temporary imbalance of the color of light to the automatic control.

Figure 6:
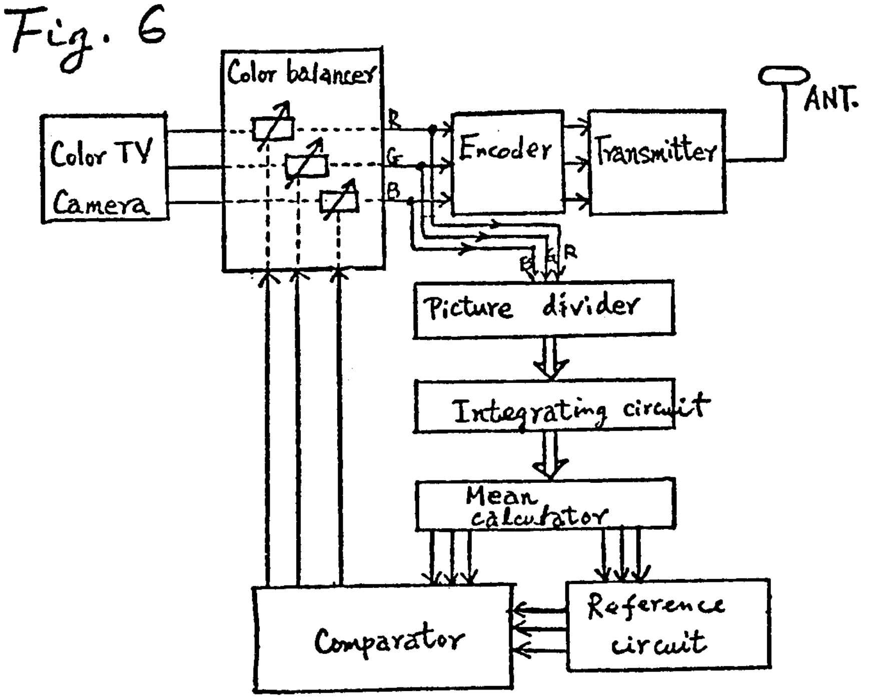
FIG. 6 is a schematic block diagram of another embodiment of the apparatus of the present invention.

This apparatus can be constituted also without photoelectric transducing elements. That is to say, as shown in FIG. 6, signals representing the intensities of the three primary color lights R, G and B can be derived directly from an electric circuit of color signals. For example, input signals to differential amplifiers can be made by taking out color signals R, G and B directly from the grid circuits or cathode circuits of a color picture tube, or directly from the output terminals of the color balancer connected thereto, sampling these signals by picture-dividing signals, determining the mean time of the sampled signals, applying the sum of these sampled-and-then-averaged signals for three primary colors R, G and B to a dividing circuit, such as shown in the drawing, so as to obtain standard values of R, G and B, and then comparing said directly obtained R, G and B signals with the standard value obtained from said dividing circuit. More particularly, as shown in FIG. 6, the signals are sampled by a picture divider means for sampling picture signals in, for example, six regions with sampled signals being fed to an integrating circuit for obtaining the mean time of the sampled signals and then to a mean calculator for calculating the desired matematical, geometric or harmonic mean. The signals are then fed from the mean calculator to a reference circuit means similar to that of the other figures which generates standard value signals by superposing and dividing the signals fed thereto. The output of the reference circuit means is fed to a comparator together with the output of the mean calculator with the comparator output being fed to the color balancer.

Although three kinds of mean values, mathematical means, geometric means or harmonic means can be used as mean values of the light intensities from several regions, the use of the harmonic means was found to provide the best results according to experiments. It is hypothetically presumed that the harmonic mean system provides good results, since in the harmonic mean system, the dark light intensity influences the computed mean value, and that color balance of the dark part of the picture is influencial to the harmony of the picture.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An apparatus for controlling the color balance of a color television system through photoelectric measurement of color images on a fluorescent screen of a color monitoring receiver, the apparatus comprising a plurality of groups of photoelectric elements, each of the groups being positioned to receive light from each of different regions on the fluorescent screen, and each of the groups including three types of photoelectric elements, said three types of photoelectric elements having different spectral sensitivities for providing outputs from which quantities of energy of three primary colors are obtained, a mean circuit for producing mean quantities of the outputs of the photoelectric elements, each mean quantity being produced as a mean of the outputs of the photoelectric elements of the same spectral sensitivity, a matrix circuit for receiving outputs of said mean circuit as input signals and for providing three outputs corresponding to quantities of the three primary colors, a reference circuit for producing three outputs by superposing input quantities which are identical to said three outputs of the matrix circuit and then dividing the superposed quantity by a predetermined ratio, and a circuit for generating color-balance control signal, responding to differences between said three outputs of the matrix circuit and the three outputs of the reference circuit, respectively.

2. The apparatus of claim 1, wherein spectral sensitivities of said three photoelectric elements have the characteristics that the three spectral sensitivities of the elements extend differently from each other in the spectral bands, a curve obtained by superposing two curves of the three spectral sensitivities of the elements extends differently in the spectral bands from the other remaining curve of the element, each of said three spectral sensitivities of the elements and at least one of the spectral distribution of the three primary colors overlap each other in extending spectral-bands, and each of said three spectral distributions of the three primary colors and at least one of the spectral sensitivity of the elements overlap each other in their spectral-band extents.

3. The apparatus of claim 2, further comprising an optical focusing system and a light diffusing plate, the optical focusing system focusing the image of the fluorescent screen on the light diffusing plate, and the photoelectric elements being positioned behind the plate.

4. The apparatus of claim 2, wherein the input quantities of the reference circuit are provided by another matrix circuit which receives the outputs of said mean circuit as input signals and produces three outputs corresponding with quantities of the three primary colors.

5. The apparatus of claim 2, wherein the input quantities of the reference circuit are the outputs of said matrix circuit.

6. The apparatus of claim 5, wherein said matrix circuit has a pair of end terminals across which a sum of outputs of the three primary colors is provided and two intermediate output terminals at which outputs corresponding to quantities of the primary colors are provided, the reference circuit is a voltage-dividing circuit comprising three series-connected resistors of predetermined resistances, both end terminals of the voltage-dividing circuit being connected to both end terminals of the matrix circuit, said voltage dividing circuit having first and second output terminals for outputting first and second outputs at two junction points in the dividing circuit, said circuit for generating color-balance control signal comprising first and second comparators, the first comparator comparing a first output of the matrix circuit with a first output of the reference circuit, and the second comparator comparing a second output of the matrix circuit with a second output of the reference circuit.

7. The apparatus of claim 2, wherein the matrix circuit has three pairs of output terminals for first, second and third primary colors, the first terminal of the first color output and the second terminal of the third color output being connected to a first end and a second end of the reference circuit which consists of three resistors in series-connection, respectively, said resistors having predetermined resistances for dividing the voltage applied to said first and second ends in a specified ratio and providing the divided voltages at a first and a second intermediate terminal between the resistors, the second terminal of the first color output and the first terminal of the second color output being connected to form a first junction point, the second terminal of the second color output and the first terminal of the third color output being connected to form a second junction point, said first intermediate terminal and said first junction point being connected to the input terminals of a first comparator, said second intermediate terminal and said second junction point being connected to the input terminals of a second comparator, output terminals of the first comparator and the second comparator being connected to the color television system for feeding a first and a third color-balance controlling signal, and output terminals of the first and the second comparators being connected to a computing circuit which provides a signal of the negative of the sum of said outputs of the comparators to the color television system as a second color-balance controlling signal.

8. An apparatus of claim 2, wherein said mean circuit comprises a means for producing each mean value of the outputs of photoelectric elements in more than six regions of a television picture.

9. An apparatus of claim 2, wherein said mean circuit is constituted by a series connection of a group of photoelectric elements for generating a signal corresponding to the harmonic mean of the outputs of the photoelectric elements.

10. An apparatus of claim 9, wherein the reference circuit includes elements having constant values selected to produce outputs $r$, $g$ and $b$ in accordance with the following inequalities and equation:

$$0.30 < r = R/(R + G + B) < 0.40$$

$$0.30 < g = G/(R + G + B) < 0.35$$

$$b = 1 - r - g,$$

wherein $R$, $G$ and $B$ are outputs of the matrix circuit for red, green and blue primary colors.

11. An apparatus of claim 2, wherein said mean circuit produces a mathematical mean of the outputs of the photoelectric elements.

12. An apparatus of claim 11, wherein the reference circuit includes elements having constant values selected to produce outputs $r$, $g$ and $b$ in accordance with the following inequalities and equation:

$$0.30 < r = R/(R + G + B) < 0.38$$

$$0.32 < g = G/(R + G + B) < 0.38$$

$$b = 1 - r - g,$$

wherein $R$, $G$ and $B$ are outputs of the matrix circuit for red, green and blue primary colors.

13. An apparatus of claim 2, wherein said mean circuit produces a geometric mean of the outputs of the photoelectric elements.

14. An apparatus of claim 13, wherein the reference circuit includes elements having constant values selected to produce outputs $r$, $g$ and $b$ in accordance with the following inequalities and equation:

$$0.30 < r = R/(R + G + B) < 0.38$$

$$0.30 < g = G/(R + G + B) < 0.38$$

$$b = 1 - r - g,$$

wherein $R$, $G$ and $B$ are outputs of the matrix circuit for red, green and blue primary colors.

15. An apparatus of claim 2, wherein photoelectric elements have spectral sensitivities corresponding to the spectral energy distributions of the primary colors, respectively.

16. A method for controlling the color balance of a color television system comprising the steps of measuring the energies of three primary colors in different regions of the picture of the system, generating three mean quantity values of the energies for the respective three primary colors from the measured energies, summing the three mean quantity values for the three primary colors and selecting three predetermined fractions of the summed value to provide three selected quantity values, comparing the three selected quantity values with the three mean quantity values, and controlling the system in accordance with any differences obtained by the comparison.

17. The method of claim 16, including the steps of measuring the energies of three primary colors in different regions on the fluorescent screen of the monitor television receiver of the system, converting the output signal of a color television signal to an encoded signal for modulating carrier signals in a transmitter and supplying the encoded signal to the monitor television receiver.

18. The method of claim 16, wherein the step of generating three mean quantity values includes generating the mean quantity values in accordance with a mathematical mean.

19. The method of claim 16, wherein the step of generating three mean quantity values includes generating the mean quantity values in accordance with a geometrical mean.

20. The method of claim 16, wherein the step of generating three mean quantity values includes generating the mean quantity values in accordance with a harmonic mean.

* * * * *